United States Patent
Daly

(10) Patent No.: US 6,572,795 B1
(45) Date of Patent: *Jun. 3, 2003

(54) PROCESS AND APPARATUS TO EVENLY FORM AN AIR FLOW VALVE

(75) Inventor: Paul D. Daly, Troy, MI (US)

(73) Assignee: Siemens VDO Automotive Inc., Chatham (CA)

( * ) Notice: Subject to any disclaimer, the term of this patent is extended or adjusted under 35 U.S.C. 154(b) by 146 days.

This patent is subject to a terminal disclaimer.

(21) Appl. No.: 09/689,062

(22) Filed: Oct. 12, 2000

Related U.S. Application Data
(60) Provisional application No. 60/158,917, filed on Oct. 12, 1999.

(51) Int. Cl.$^7$ ............................................. B29C 51/42
(52) U.S. Cl. ..................... 264/40.1; 264/275; 264/219; 425/394; 425/403
(58) Field of Search ............................... 264/40.1, 40.3, 264/442, 275, 278, 319, 328.6; 425/394, 405, 577, DIG. 58; 156/64, 272.8

(56) References Cited

U.S. PATENT DOCUMENTS

| | | | |
|---|---|---|---|
| 3,784,343 A * | 1/1974 | Iwasaki ...................... 425/352 |
| 4,172,112 A | 10/1979 | Tsukagoshi et al. ........ 264/113 |
| 5,035,214 A | 7/1991 | Daly et al. .................. 123/337 |
| 5,081,972 A | 1/1992 | Daly et al. .................. 123/337 |
| 5,098,064 A | 3/1992 | Daly et al. .................. 251/306 |
| 5,788,909 A | 8/1998 | Kreutzer et al. ............ 264/320 |
| 5,820,894 A | 10/1998 | Kreutzer ..................... 425/389 |
| 5,902,426 A | 5/1999 | Daly ........................... 156/64 |
| 6,116,215 A | 9/2000 | Soleanicov et al. ......... 123/399 |

FOREIGN PATENT DOCUMENTS

| | | |
|---|---|---|
| EP | 0 899 073 | 3/1999 |
| EP | 1095751 * | 5/2001 |
| FR | 2 687 601 | 8/1993 |
| WO | WO 93 15901 | 8/1993 |

* cited by examiner

Primary Examiner—Robert Davis
Assistant Examiner—Thu Khanh T. Nguyen

(57) ABSTRACT

A process for manufacturing an air flow assembly having a valve disc within a bore. A first support is inserted into the bore from below the valve disc, and a second "floating" support is inserted from above the disc. The second support "floats" relative to the disc upon a fluid receiving member such as an inflatable bellows. As the fluid receiving member allows the second support to float when contacting the disc, any inconstancies of the disc are compensated by the "floating" second support. As the disc is squeezed between the supports heat conducted from heaters causes the material of the disc to be extruded radially outwardly into contact with the bore to obtain a consistent thickness at the disc outer periphery.

19 Claims, 3 Drawing Sheets

PROCESS AND APPARATUS TO EVENLY FORM AN AIR FLOW VALVE

This application claims priority to U.S. provisional application Serial No. 60/158,917 filed on Oct. 12, 1999.

BACKGROUND OF THE INVENTION

The present invention relates to techniques for manufacturing assemblies of molded parts, and more particularly to techniques for manufacturing a throttle valve disc within a throttle body.

Air flow valves include a flow control blade or disc which fit into a bore in a throttle body which defines an air flow passage. The disc is pivoted on a shaft to open and close the flow passage, and must fit accurately to be able to rotate between a closed position allowing a low flow of air and open positions. With machined or stamped metal parts, a sufficiently accurate fit has been obtained by a technique of centering the disc at assembly.

However, where the valve body and the valve disc are both molded of a non-metallic material, a difficult manufacturing problem is encountered due to the close tolerances required for a proper fit. One difficulty is assuring that the outer periphery of the disc contacts the inner bore while having a substantially constant thickness. Typically, a fixed upper and lower forming support form the disc within the bore of the throttle body. However, the disc material or thickness may be inconsistent prior to the final forming operation. If one portion of the disc is thicker than another portion, the rigid support may squeeze the thick portion first and provide an inconsistent disc perimeter thickness. This may slow the time to process the disk to a required minimum airflow in the throttle body.

Accordingly, it is desirable to provide a manufacturing process for molding an accurately fitted valve disc of an air flow valve which provides a controllable outer periphery thickness and can be carried out without a complex mold configuration.

SUMMARY OF THE INVENTION

The forming assembly according to the present invention includes a first support insertable into a bore of an air flow assembly such as a throttle body system having a valve disc within a bore. For descriptive purposes, the first support is inserted into the bore from below the valve disc, and a second support inserted from above the disc. Each support includes an integral heater for heating and forming of the disc and a pair of relatively narrow semi-circular or semi-elliptical style forming segment.

The second support floats relative to the disc upon a fluid receiving member such as an inflatable bellows. A support structure extends from the second support to retain the fluid receiving member. The support structure is preferably manufactured of a thermally insulated material such that heat from the heaters is not conducted to the fluid within the fluid receiving member. An arbor preferably having an outwardly extending flange engages an inwardly extending flange of the support structure such that the airflow assembly is locatable within and removable from the forming assembly. The fluid such as hydraulic oil is maintained in a supply and is pumped through the arbor and into and out of the fluid receiving member.

A method according to the present invention includes moving the first support into contact with the disc while substantially simultaneously moving the second support into contact with an opposite side of the disc. Importantly, the fluid receiving member allows the second support to "float" when engaging the disc. As the fluid receiving member allows the second support to "float" when contacting the disc, any inconstancies of the disc are compensated by the "floating" second support. In other words, if one portion of the disc is thicker than another portion, the second support pivots or cants to compensate for the disc surface. Fluid is pumped through the arbor and into the fluid receiving member such that the disc is squeezed between the first and second support. As the disc is squeezed between the supports heat conducted from the heaters causes the material of the disc to be extruded radially outwardly into contact with the bore. Deformation of the disc is monitored and controlled by a controller which monitor the volume of fluid which is pumped into the fluid receiving member.

Once the thermoforming operation is complete and the desired thickness at the perimeter of the disc is obtained, the fluid pressure within the fluid receiving member is relieved. The supports may then be withdrawn from within the system.

The present invention therefore provides a manufacturing process for molding an accurately fitted valve disc of an air flow valve which provides a controllable outer periphery thickness and can be carried out without a complex mold configuration.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
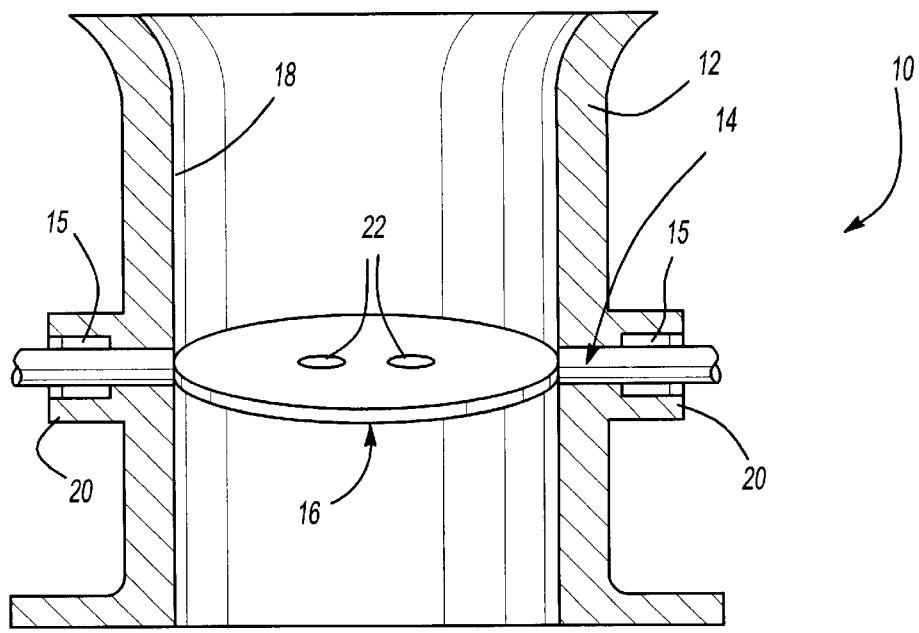
FIG. 1 is a general sectional view of a vehicle throttle body system.

FIG. 1 illustrates a sectional view of an air flow assembly such as a throttle body system 10 for a vehicle. The system 10 generally includes a housing throttle body 12, a support shaft 14, and disc or blade 16. Preferably each component is molded separately using conventional techniques and the disc 16 is initially molded to be substantially undersized from the size of the bore 18 within the throttle body 12.

The shaft 14 is assembled to the throttle body housing 12 such that the shaft 14 passes through a bearing 15 located within each boss 20. The disc is preferably fixedly attached at this time by heat staking shaft bosses 22. The details of a preferred heat staked connection are set forth in U.S. Pat. No. 5,666,988 issued Sep. 16, 1997, assigned to the same assignee as the present application. Other known methods of shaft to blade attachment can also be used.

Figure 2:
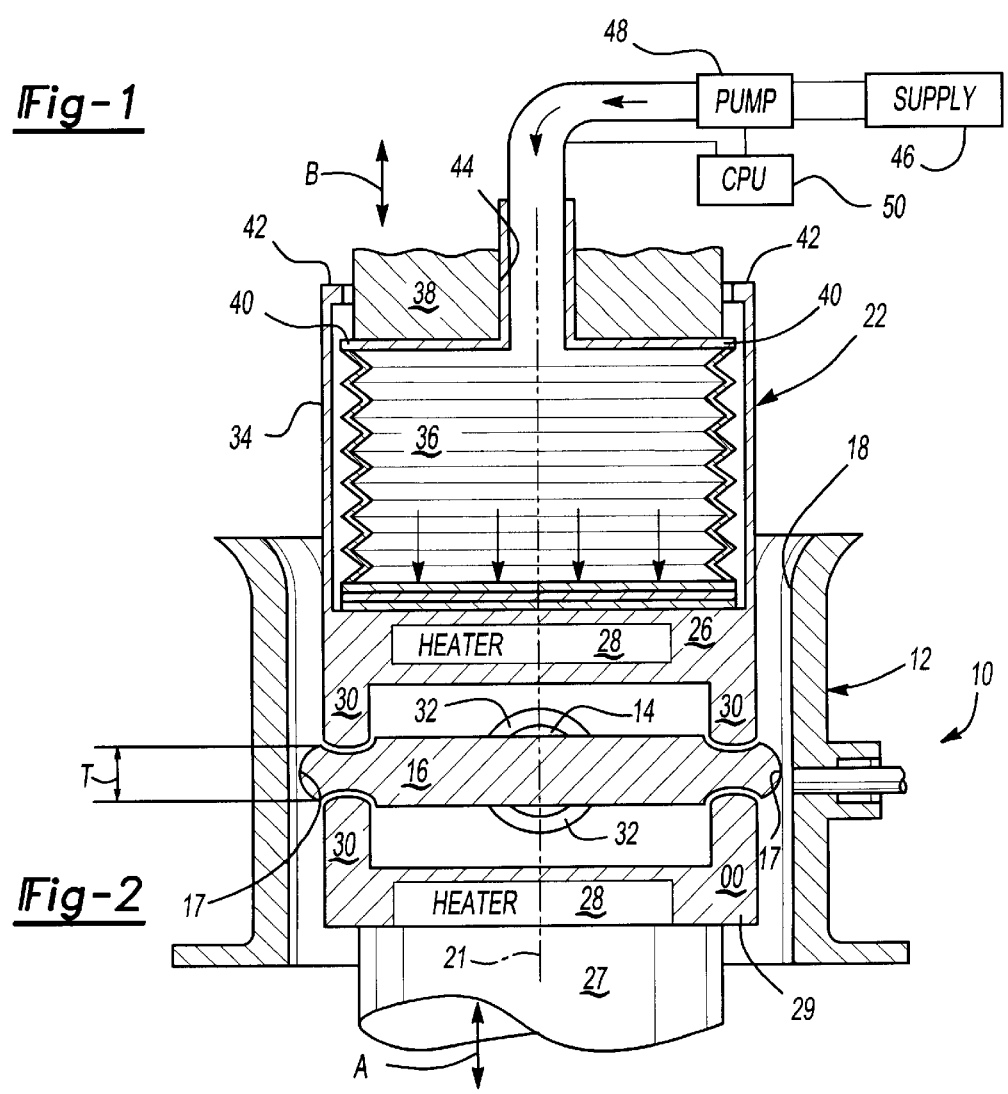
FIG. 2 is a sectional view of the throttle body system located within a molding assembly according to the present invention.

Referring to FIG. 2, the disc 16 is oriented within bore 18 at an angle of approximately 3 to 8 degrees from perpendicular with respect to a central axis 21 defined by the bore 18. Preferably, the disc 16 is finally sized by being thermoformed while in this position, causing the disc material to be forced outwardly or extruded into contact with the bore wall to be precisely sized and centered within the bore 18.

The disc 16 is preferably preheated to between 100 and 300 degrees Fahrenheit prior to the final sizing operation. Preferably, the disc material is of a lower melting point material than that of the throttle body housing 12. For example only, Nylon 6 could be used for the disc, Nylon 66 for the body 12.

A forming assembly 22 receives the system 10 once the shaft 14 and disc 16 are assembled to the throttle body housing 12. The assembly 22 includes a first support 24 inserted into the bore 18 from below the disc 16, and a second support 26 inserted from above the disc 16. The thermoforming operation and the relative orientation or angle of the supports 24,26 is preferably set to provide the disc with an idle position having a perimeter chamfer optimized for the slight 3 to 8 degree angle.

Each support 24,26 includes an integral heater 28 for heating and forming of the disc 16. The supports 24, 26 are thereby heated, for example by an electrical heater coil disposed therein or by other heating arrangements such as by the flow of heated fluid. Other ways of heating the disc 16 may be further employed, such as by using a laser source or by ultrasonic energy to cause appropriate softening sufficient to carry out the disk deforming process.

Figure 2A:
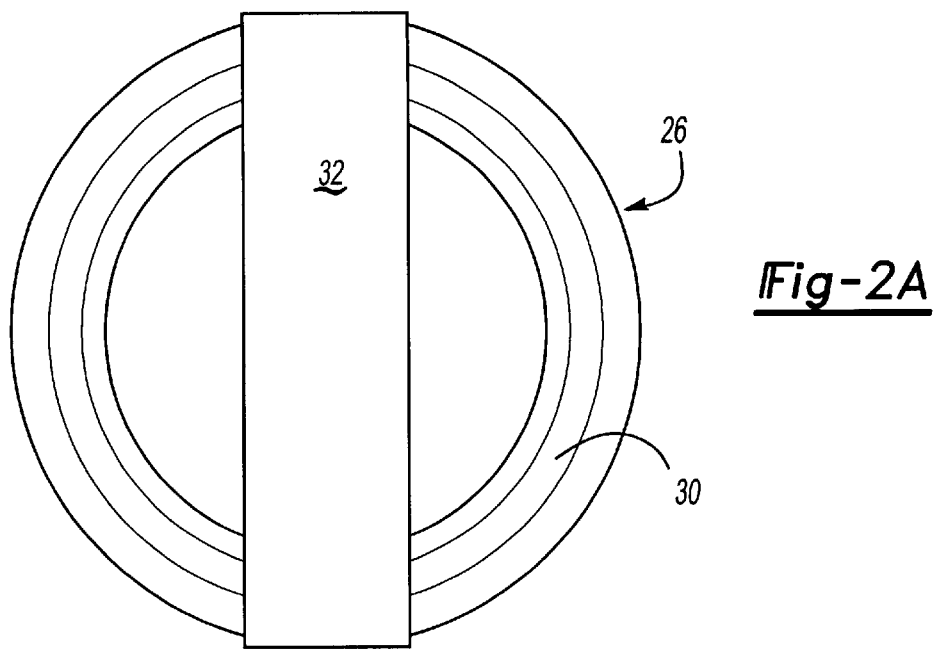
FIG. 2A is an exploded facial view of a support illustrating the pairs of forming segments.

The supports 24,26 include a relatively narrow semicircular or semi-elliptical forming segments 30 (FIG. 2A) substantially corresponding to the shape of disc 16. The segments 30 form an outer perimeter of the supports 24,26. Preferably, the segments 30 extend about the periphery of a relieved area 32 which forms a recessed area within the segments 30. The relieved area forms a clearance between the shaft 14 and the supports 24, 26 when the supports 24, 26 are closed onto the disc 16. The segments 30, concentrate the extruding pressure in a narrow annular area adjacent the outer perimeter 17 of the disc 16.

The first support 24 is movable into contact with the disc 16 by an associated driving element (illustrated schematically at 27). The driving element 27 moves the first support 24 in the direction of double headed arrow A such that the system 10 can be located within and removed from the forming assembly 22 by appropriately moving the driving element 27.

The second support 26 includes a support structure 34 which contains a fluid receiving member 36 such as a bellows 36. The support structure 34 is preferably manufactured of a thermally insulated material such that heat from the heater 28 is not conducted to the fluid within the fluid receiving member 36. An arbor 38 preferably having an outwardly extending flange 40 engages an inwardly extending flange 42 of the support structure 34. The arbor 38 is movable in the direction of double headed arrow B. By moving the arbor 38 in a direction away from the disc 16, the outwardly extending flanges 40 engage the inwardly extending flanges 42 to move the second support 26 out of the throttle body 12 such that the system 10 can be located within and removed from the forming assembly 22.

An aperture 44 is preferably located through the arbor 38 such that a fluid can be passed through the arbor 38 and into the fluid receiving member 36. The fluid such as hydraulic oil is maintained in a supply (illustrated schematically at 46). A pump (illustrated schematically at 48), preferably pumps the fluid into and out of the fluid receiving member 36 in response to a controller (illustrated schematically at 50).

A method for producing the system 10 will now be described. However, it should be realized that the use of a throttle valve system is for illustrative purposes only, and that the methodology of the present invention may be applied to other vehicle components. Preferably, each below described step is operated and monitored by the controller 50 to assure accurate and repeatable operation.

Figure 3:
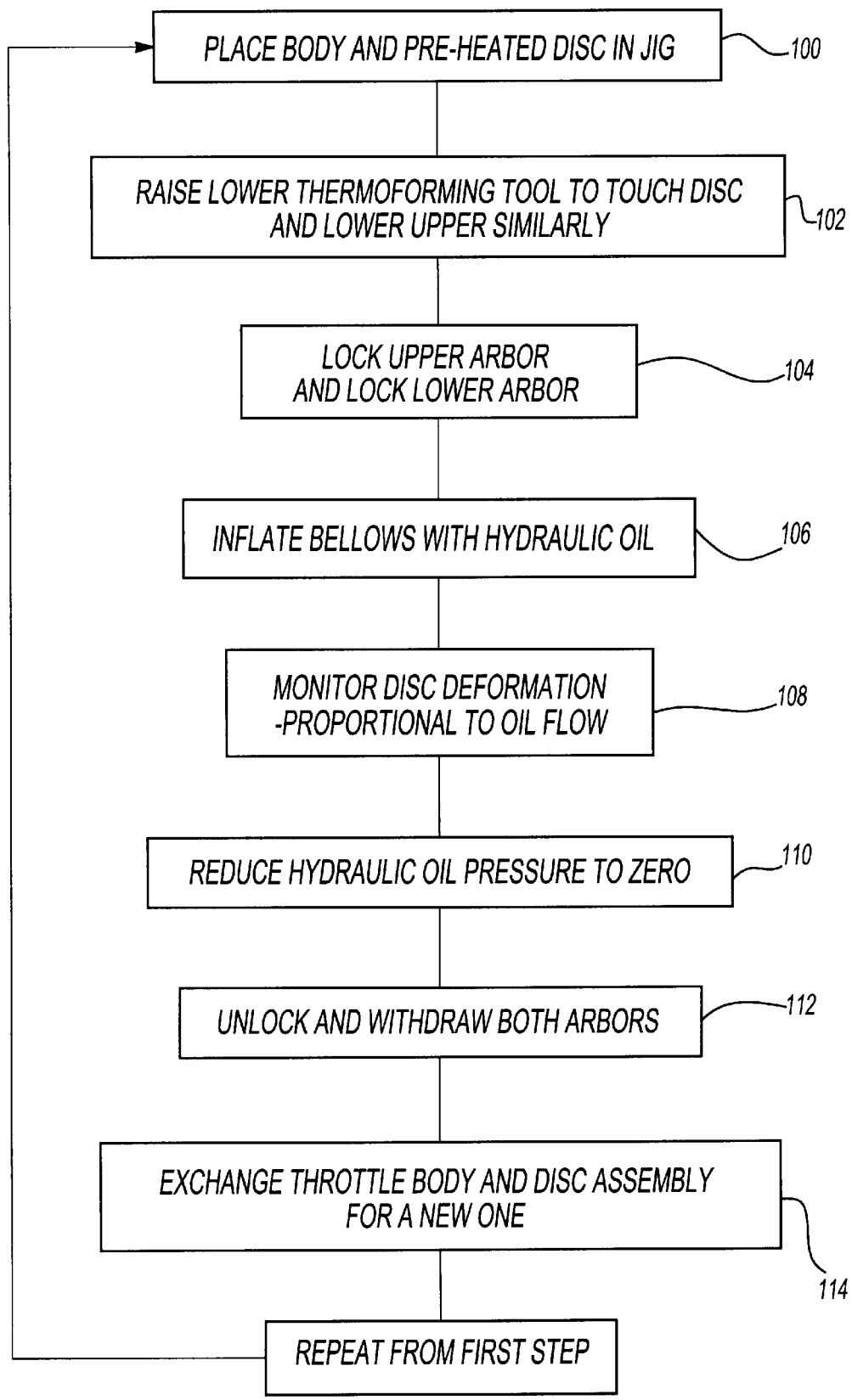
FIG. 3 is a flow diagram showing the steps of an embodiment of the process of the present invention.

Referring also to FIG. 3, the first step (step 100) includes locating the system 10 within the forming assembly 22. As described, above, the disc 16 has been previously preheated in a known manner. The supports 24, 26 may also be in an at least partially heated condition by the integral heaters 28.

The first support 24 is moved into contact (step 102) with the disc 16 by the driving element 27. Substantially simultaneously, the second support 26 is lowered toward the disc 16 such that the second support 26 contacts the disc 16. Once the supports 24,26 contact the disc 16, the arbor 38 and the drive element 27 are locked in position at step 104.

Figure 2B:
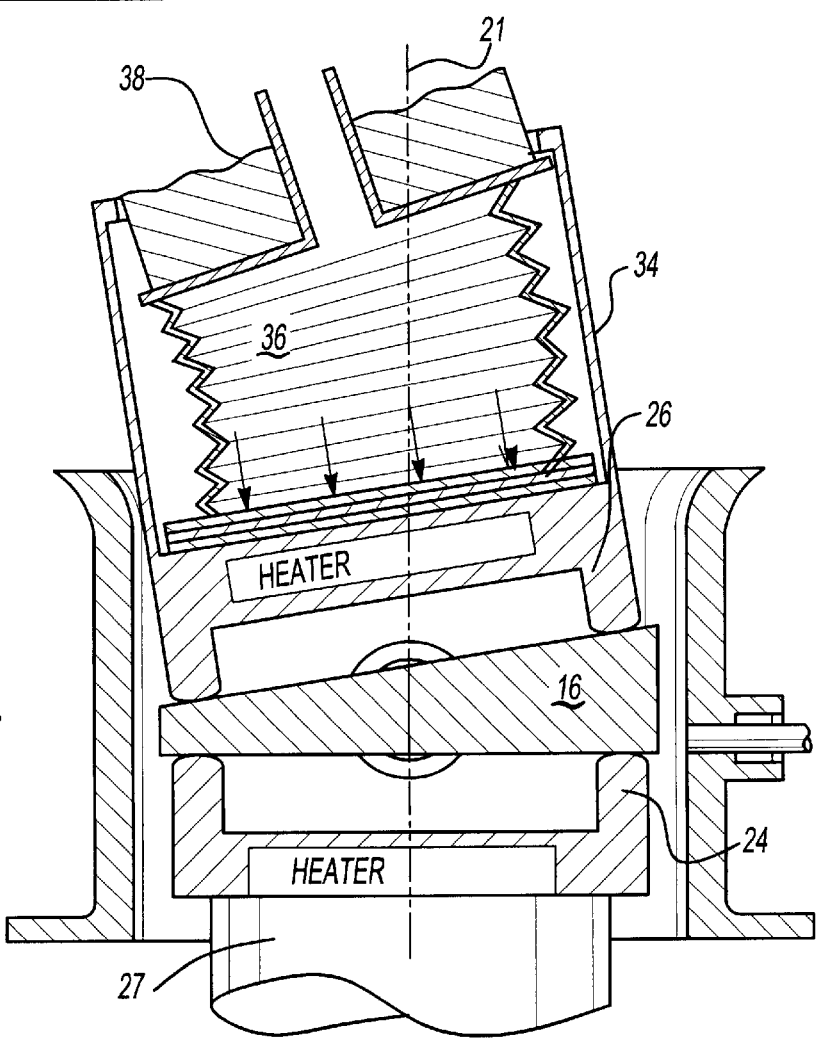
FIG. 2B is a sectional view of the throttle body system having an exaggerated inconsistent thickness valve disc located illustrating the "floating" support according to the present invention.

Importantly, the fluid receiving member 36 allows the second support 26 to "float" when contacting the disc 16. In some instances, tolerance differences, inconsistencies in the disc material or in the preheating process, the disc 16 may not provide an entirely planar or level surface. As the fluid receiving member 36 allows the second support 26 to "float" when contacting the disc 16, any inconstancies of the disc 16 are compensated by the "floating" second support 26 (illustrated in a highly exaggerated manner in FIG. 2B). In other words, if one portion of the disc 16 is thicker than another portion the inventive second support pivots or cants relative to axis 21 to adjust and contact a greater portion of the disc 16. Notably, a fixed support would simply squeeze the thick portion first and provide an inconsistent perimeter. Accordingly, the present invention provides a more consistent thickness (illustrated as thickness T in FIG. 2) at the perimeter of the disc 16.

Fluid is then pumped through the arbor 38 and into the fluid receiving member 36 at step 106. The fluid inflates the fluid receiving member 36 such that the disc 16 is squeezed between the first and second support 24, 26. As the disc 16 is squeezed between the supports 24,26, heat conducted from the heaters 28 and through the segments 30 cause the material of the disc 16 to be extruded radially outwardly into contact with the bore 18. This may create a slight annular bulge at the perimeter of the disc 16.

Deformation of the disc 16 is monitored at step 108. Preferably, the controller 50 communicates with the pump 48 to monitor the volume of fluid which is pumped into the fluid receiving member 36. Further, detection of the pressure within the fluid receiving member 36 can additionally or alternatively be used as a control signal to control the second support 26. Although particular measurements are disclosed other measurements will benefit from the present invention to provide a controlled and consistent thickness T.

Once the thermoforming operation is complete and the desired thickness T at the perimeter of the disc 16 is obtained, the fluid pressure within the fluid receiving member 36 is relieved at step 110. The arbor 38 and the drive element 27 are unlocked and the supports 24, 26 are withdrawn from the system 10 at step 112.

The system 10 can then be removed from the forming assembly 22 at step 114 and the operation is repeated for the next system 10.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A forming assembly for a vehicle air flow assembly having a valve disc within a bore, said forming assembly comprising:

a first support having a first forming segment and a first heater, said first support movable relative to a first side of the disc;

a second support having a second forming segment and a second heater, said second support movable relative to a second side of the disc; and a fluid receiving member adjacent said second support, said fluid receiving member operable to float said second support relative to the second side of the disc and to exert a force upon said second support such that the disc is pressed between the first and second forming segment to displace an outer periphery of the disc toward the bore.

2. A forming assembly for a vehicle air flow assembly having a valve disc within a bore, said forming assembly comprising:

a first support having a first forming segment mid a first heater, said first support movable relative to a first side of the disc;

a second support having a second forming segment and a second heater, said second support movable relative to a second side of the disc said first and second forming segments substantially corresponding to the outer periphery of the disc; and a fluid receiving member adjacent said second support, said fluid receiving member operable to float said second support relative to the second side of the disc and to exert a force upon said second support such that the disc is pressed between the first and second forming segment to displace an outer periphery of the disc toward the bore.

3. The assembly as recited in claim 2, wherein said first and second forming segments are substantially annular.

4. The assembly as recited in claim 1, further comprising a support structure extending from said second support, said fluid receiving member located substantially within said support structure.

5. The assembly as recited in claim 4, wherein said support structure is manufacture of a thermally insulating material.

6. The assembly as recited in claim 4, further comprising a movable arbor, said movable arbor engageable with said support structure to move said second support relative to the disc.

7. The assembly as recited in claim 6, wherein said fluid receiving member extends from said movable arbor.

8. The assembly as recited in claim 7, wherein said movable arbor includes an aperture to communicate fluid from a supply to said fluid receiving member.

9. The assembly as recited in claim 1, wherein said fluid receiving member includes a bellows.

10. A method of manufacturing a valve disc within a bore of a vehicle air flow assembly comprising the steps of:

(1) locating a fixed first support having a first forming surface within the bore and adjacent a first surface of the disc;

(2) locating a floating second support having a second forming surface within the bore and adjacent a second surface of the disc, said floating second support displaceable in response to said second surface such that said second forming surface substantially adjusts to said second surface; and (3) inflating a fluid receiving member adjacent said second support to exert a pressure upon said second support such that said first and second forming segments displace an outer periphery of the disc toward the bore.

11. A method as recited in claim 10, further including the step of floating said second support upon said fluid receiving member.

12. A method as recited in claim 10, further including the step of heating said first and said second support.

13. A method as recited in claim 10, further including the step of monitoring a pressure within said fluid receiving member.

14. A method as recited in claim 10, further including the step of monitoring a volume of fluid within said fluid receiving member.

15. A method as recited in claim 10, further including the step of controlling a thickness of the outer periphery of the disc in relation to said step 3.

16. A method of displacing an outer periphery of a valve disc toward a bore of a vehicle throttle system comprising the steps of:

(1) locating a fixed first support having a first forming surface within the bore and adjacent a first surface of the disc, the disc being undersized relative to the bore;

(2) locating a floating second support adjacent a fluid receiving member, said second support having a second forming surface within the bore and adjacent a second surface of the disc, said floating second support displaceable in response to said second surface such that said second forming surface substantially adjusts to said second surface;

(3) heating said first and said second support;

(4) communicating a fluid into said fluid receiving member to inflate said fluid receiving member and exert a pressure upon said second support such that said first and second forming segments press the disc and displace an outer periphery of the disc toward the bore;

(5) monitoring the communication of fluid in said step (4); and (6) controlling the displacement of the outer periphery in relation to said step (5).

17. A method as recited in claim 16, wherein said step 6 includes controlling a thickness of the outer periphery of the disc.

18. A method as recited in claim 16, further including the step of preheating the disc.

19. A method as recited in claim 16, further including the step of monitoring the pressure within said fluid receiving member.

* * * * *